(12) United States Patent
Hagihara (10) Patent No.: US 11,618,284 B2
(45) Date of Patent: Apr. 4, 2023

(54) TIRE

(71) Applicant: SUMITOMO RUBBER INDUSTRIES, LTD., Hyogo (JP)

(72) Inventor: Takashi Hagihara, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 296 days.

(21) Appl. No.: 16/713,495

(22) Filed: Dec. 13, 2019

(65) Prior Publication Data

US 2020/0198408 A1    Jun. 25, 2020

(30) Foreign Application Priority Data

Dec. 20, 2018  (JP) .............................. JP2018-238692

(51) Int. Cl.
*B60C 11/13*   (2006.01)
*B60C 11/12*   (2006.01)
*B60C 11/03*   (2006.01)

(52) U.S. Cl.
CPC .......... *B60C 11/13* (2013.01); *B60C 11/1204* (2013.01); *B60C 11/1236* (2013.01); *B60C 2011/0365* (2013.01); *B60C 2011/0369* (2013.01); *B60C 2011/1254* (2013.01)

(58) Field of Classification Search
CPC ............. B60C 11/13; B60C 2011/0381; B60C 2011/0351; B60C 2011/0339; B60C 11/1392
See application file for complete search history.

(56) References Cited

U.S. PATENT DOCUMENTS

| | | | |
|---|---|---|---|
| 2008/0000564 A1* | 1/2008 | Mukai | B60C 11/1384 |
| | | | 152/209.8 |
| 2010/0252159 A1* | 10/2010 | Mukai | B60C 11/1369 |
| | | | 152/209.25 |
| 2015/0258858 A1* | 9/2015 | Kujime | B60C 11/1392 |
| | | | 152/209.8 |
| 2016/0082780 A1 | 3/2016 | Nagahara et al. | |
| 2016/0144667 A1* | 5/2016 | Iwatani | B60C 11/0008 |
| | | | 152/209.7 |
| 2017/0015144 A1* | 1/2017 | Ogihara | B60C 11/1204 |
| 2018/0319219 A1* | 11/2018 | Oba | B60C 11/0332 |

FOREIGN PATENT DOCUMENTS

| | | | | |
|---|---|---|---|---|
| JP | 2016-064726 | | 4/2016 | |
| JP | 2018188009 A | * | 11/2018 | ......... B60C 11/1204 |

* cited by examiner

*Primary Examiner* — Cedrick S Williams
(74) *Attorney, Agent, or Firm* — Greenblum & Bernstein P.L.C.

(57) ABSTRACT

A tire includes a tread portion. The tread portion has a main groove extending continuously in a tire circumferential direction, and a land portion adjacent to the main groove. The land portion has lateral grooves extending from the main groove in a tire axial direction. Each of the lateral grooves has a first portion communicating with the main groove, and a second portion connected to the first portion. The first portion has a larger groove width than the second portion and has a smaller groove depth than the second portion.

20 Claims, 9 Drawing Sheets

TIRE

BACKGROUND OF THE INVENTION

Field of the Invention

The present invention relates to a tire having lateral grooves provided on a tread portion.

Description of the Background Art

Japanese Laid-Open Patent Publication No. 2016-64726 discloses a tire including middle land portions formed between shoulder main grooves and center main grooves. Each middle land portion has middle lug grooves each including a wide-width portion and a narrow-width portion having a smaller groove width than the wide-width portion. The wide-width portion has a first end of the middle lug groove located at the main groove, and extends toward the inside of the land portion. The narrow-width portion is connected to the wide-width portion via a step portion and has a second end of the middle lug groove. Each middle lug groove has a groove width that gradually decreases from the first end toward the second end. Such a middle lug groove has a large edge component and snow column shearing force, and also smoothly discharges snow held within the groove, to the main groove.

Moreover, the middle lug grooves include first middle lug grooves each having the first end located at the shoulder main groove, and second middle lug grooves each having the first end located at the center main groove, and the first and second middle lug grooves are alternately provided in the tire circumferential direction. Such middle lug grooves ensure the stiffness of the middle land portion in a well-balanced manner in the tire axial direction. Therefore, this type of tire has improved ice and snow road performance and steering stability on a dry road (hereinafter, sometimes simply referred to as "steering stability").

However, in recent years, global warming has progressed, so that opportunities to drive on dry roads have been increasing as compared to those on ice and snow roads. Therefore, for such tires, further improvement of steering stability with ice and snow road performance maintained is required.

The present invention has been made in view of the above-described problem, and a main object of the present invention is to provide a tire that is capable of improving steering stability while maintaining ice and snow road performance.

SUMMARY OF THE INVENTION

The present invention is directed to a tire including a tread portion, wherein the tread portion has a main groove continuously extending in a tire circumferential direction, and a land portion adjacent to the main groove, the land portion has lateral grooves extending from the main groove in a tire axial direction, each of the lateral grooves has a first portion communicating with the main groove, and a second portion connected to the first portion, and the first portion has a larger groove width than the second portion and has a smaller groove depth than the second portion.

In the tire according to the present invention, preferably, the first portion includes a main body part having a first depth and a sub part having a second depth smaller than the first depth, and the main body part and the sub part are aligned in the tire circumferential direction.

In the tire according to the present invention, the first portion preferably includes a groove wall formed in a step shape by the main body part and the sub part.

In the tire according to the present invention, the main body part of the first portion preferably has a groove width equal to that of the second portion.

In the tire according to the present invention, each of the lateral grooves preferably has a terminal end within the land portion.

In the tire according to the present invention, the land portion preferably has sipes extending from the terminal end.

In the tire according to the present invention, preferably, the land portion has circumferential recesses that are provided at a corner portion between a tread surface of the land portion and a groove wall of the main groove and that extend in the tire circumferential direction, and each of the circumferential recesses communicates with a first side in the tire circumferential direction of the first portion of the lateral groove.

In the tire according to the present invention, the first portion preferably has a main body part having a first depth, and each of the circumferential recesses communicates with the main body part of the first portion of the lateral groove.

In the tire according to the present invention, preferably, the land portion has chamfers that are provided at the corner portion between the tread surface of the land portion and the groove wall of the main groove, that extend in the tire circumferential direction, and that are recessed less than the circumferential recesses, and each of the chamfers communicates with a second side in the tire circumferential direction of the first portion of the lateral groove.

In the tire according to the present invention, preferably, the tread portion has a crown land portion, a pair of middle land portions adjacent to the crown land portion, and a pair of shoulder land portions adjacent to the middle land portions and provided at endmost tread edge sides, and the land portion is formed as the pair of middle land portions.

In the tire according to the present invention, preferably, each of the middle land portions has, as the lateral grooves, first middle lateral grooves each having the first portion at the crown land portion side, and second middle lateral grooves each having the first portion at the shoulder land portion side, and the first middle lateral grooves and the second middle lateral grooves are alternately provided in the tire circumferential direction.

In the tire according to the present invention, preferably, the tread portion specifies how the tire is to be oriented when mounted to a vehicle, the middle land portions include an outer middle land portion located at an outer side of the vehicle when the tire is mounted on the vehicle, and, in the outer middle land portion, the second middle lateral grooves are formed without facing the first portions of the first middle lateral grooves in the tire circumferential direction.

In the tire according to the present invention, preferably, the outer middle land portion has outer middle sipes extending in the tire axial direction, and a length in the tire axial direction of each outer middle sipe is 125% to 150% of a length in the tire axial direction of each of the first middle lateral grooves and the second middle lateral grooves provided to the outer middle land portion.

In the tire according to the present invention, a length in the tire axial direction of each of the first middle lateral grooves and the second middle lateral grooves is preferably 50% to 75% of a width in the tire axial direction of the outer middle land portion.

In the tire according to the present invention, preferably, the tread portion specifies how the tire is to be oriented when mounted to a vehicle, the middle land portions include an inner middle land portion located at an inner side of the vehicle when the tire is mounted on the vehicle, and, in the inner middle land portion, the second middle lateral grooves are formed so as to face the first portions of the first middle lateral grooves in the tire circumferential direction.

In the tire according to the present invention, the land portion is preferably formed as the crown land portion.

In the tire according to the present invention, the land portion has lateral grooves each of which has a first portion communicating with the main groove and a second portion connected to the first portion. Generally, the stiffness of a region, adjacent to the first portion, of the land portion is lower than the stiffness of a region, adjacent to the second portion, of the land portion. In each of the lateral grooves of the present invention, the first portion has a larger groove width than the second portion and has a smaller groove depth than the second portion. The land portion having the lateral grooves including the first portion having a smaller groove depth as described above has a reduced difference between the stiffness of the region adjacent to the first portion and the stiffness of the region adjacent to the second portion, and thus can exert effective friction force on a road surface over a wide range of the tread surface of the land portion. Moreover, the first portion having a larger groove width smoothly discharges snow or ice (water may be contained) held within the second portion, to the main groove. Therefore, the tire according to the present invention is capable of improving steering stability while maintaining ice and snow road performance.

BRIEF DESCRIPTION OF THE DRAWINGS

FIG. 3($a$) is a cross-sectional view taken along a line A-A in FIG. 1;

FIG. 3($b$) is an end view as seen from a line B-B in FIG. 1;

DESCRIPTION OF THE PREFERRED EMBODIMENTS

Hereinafter, an embodiment of the present invention will be described with reference to the drawings.

Figure 1:
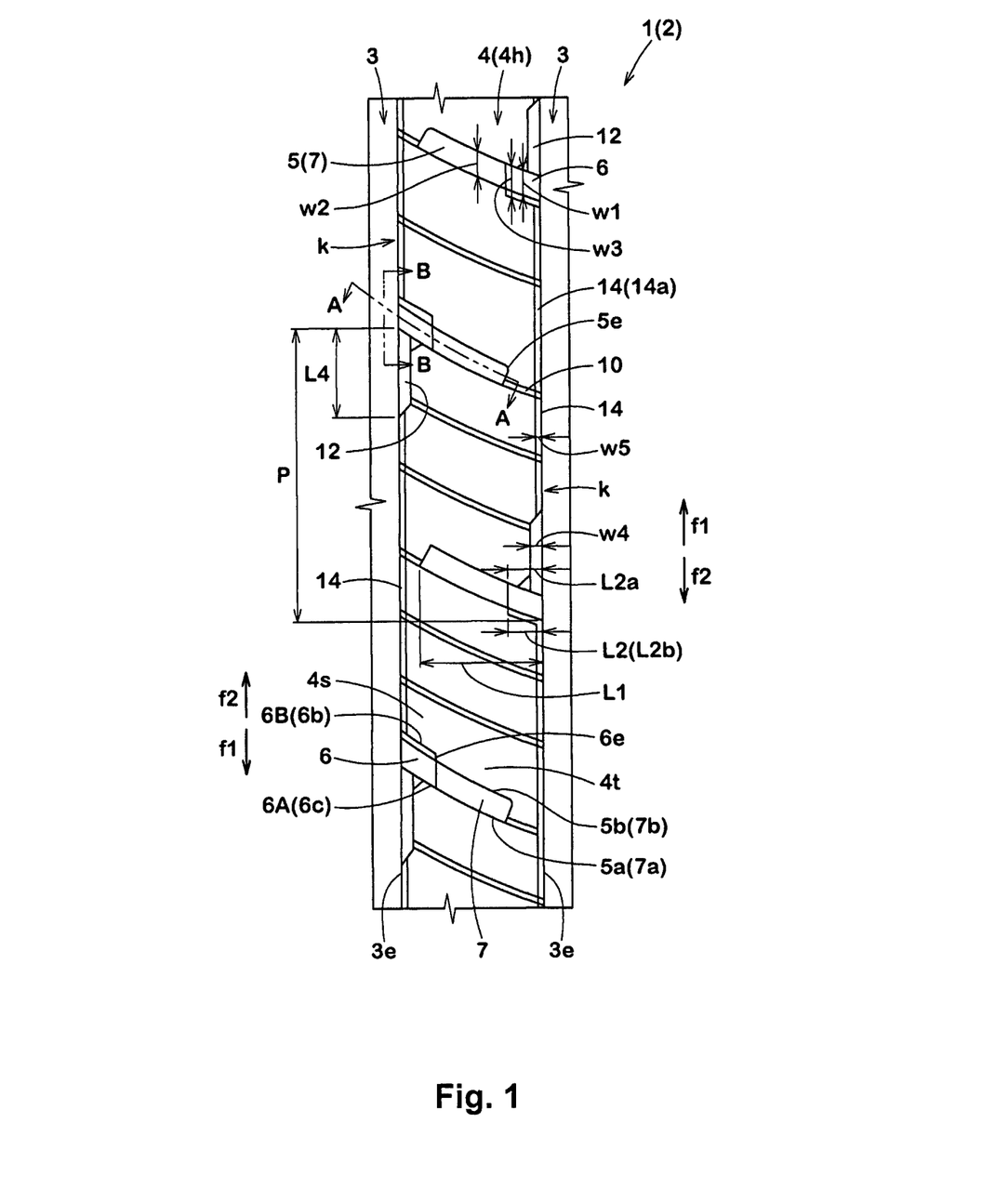
FIG. 1 is a partial development of a tread portion of a tire according to an embodiment of the present invention.

FIG. 1 is a partial development of a tread portion 2 of a tire 1 according to the present embodiment. FIG. 1 shows a tread portion 2 of a pneumatic tire for a passenger car as a preferred embodiment. However, the present invention can be applied to a pneumatic tire for a two-wheeled automotive vehicle and a heavy-duty pneumatic tire, and also to tires in the other categories.

As shown in FIG. 1, the tread portion 2 of the present embodiment has main grooves 3 continuously extending in the tire circumferential direction, and a land portion 4 adjacent to the main grooves 3. The land portion 4 of this embodiment is demarcated by the main grooves 3, 3 provided at both sides in the tire axial direction. The land portion 4 is not limited to such a mode, and may be demarcated, for example, by the main groove 3 and a tread edge Te (shown in FIG. 4). For the main grooves 3 and the land portion 4, known modes can be selected as appropriate.

The land portion 4 of this embodiment has lateral grooves 5 extending from the main grooves 3 in the tire axial direction. Such lateral grooves 5 have snow column shearing force and exhibit ice and snow road performance.

The lateral grooves 5 of the present embodiment are inclined relative to the tire axial direction. The lateral grooves 5 are, for example, aligned in the tire circumferential direction. In the present embodiment, the respective lateral grooves 5 are inclined in the same direction.

Figure 2:
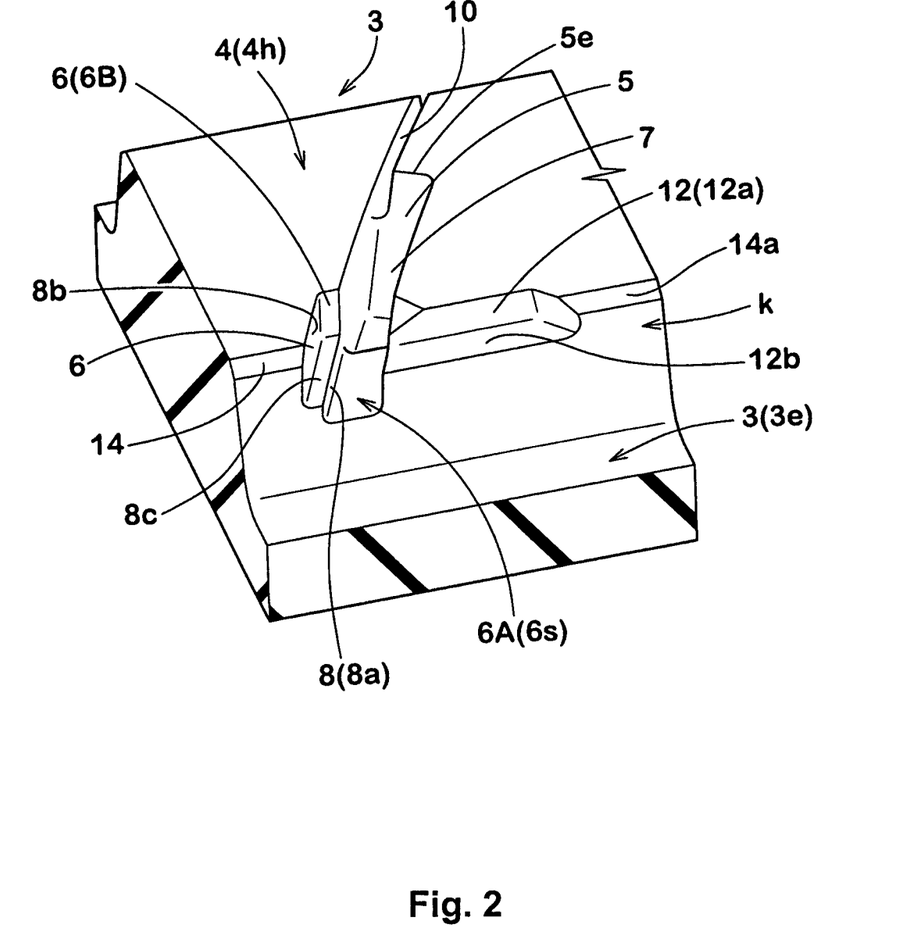
FIG. 2 is a perspective view of a lateral groove in FIG. 1.
Figure 3:
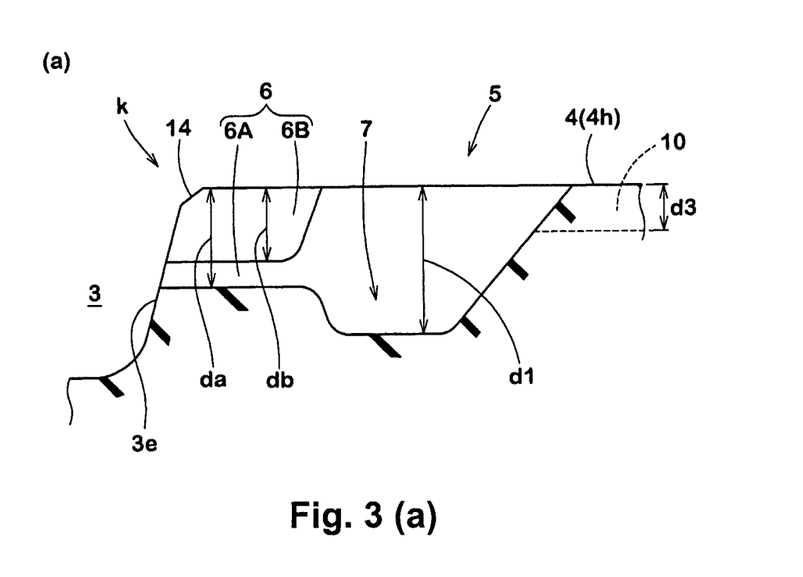

FIG. 2 is a perspective view of the lateral groove 5. FIG. 3($a$) is a cross-sectional view taken along a line A-A in FIG. 1, and FIG. 3($b$) is an end view as seen from a line B-B in FIG. 1. As shown in FIG. 1 to FIG. 3($b$), the lateral groove 5 includes a first portion 6 that communicates with the main groove 3, and a second portion 7 that is connected to the first portion 6. The first portion 6 has a larger groove width than the second portion 7 and has a smaller groove depth than the second portion 7. The land portion 4 having the lateral grooves 5 each including the first portion 6 having a smaller groove depth as described above, has a reduced difference between the stiffness of a region 4$s$ adjacent to the first portion 6 in the tire circumferential direction and the stiffness of a region 4$t$ adjacent to the second portion 7 in the tire circumferential direction. Thus, the land portion 4 can exert great friction force on a road surface over a wide range of a tread surface 4$h$ of the land portion 4. In addition, the first portion 6 having a larger groove width maintains smooth discharge of snow or ice held within the second portion 7. Therefore, such a tire 1 is capable of improving steering stability while maintaining ice and snow road performance.

The first portion 6 includes a main body part 6A having a first depth da, and a sub part 6B having a second depth db smaller than the first depth da, and the main body part 6A and the sub part 6B are aligned in the tire circumferential direction. The sub part 6B of such a first portion 6 keeps the stiffness of the region 4$s$ of the land portion 4 high, and thus the first portion 6 improves the steering stability. In addition, the main body part 6A exerts great snow column shearing force.

In the present embodiment, the second depth db of the sub part 6B is preferably 60% to 85% of the first depth da of the main body part 6A. If the second depth db of the sub part 6B is less than 60% of the first depth da of the main body part 6A, or if the second depth db of the sub part 6B is greater than 85% of the first depth da of the main body part 6A, imbalance in stiffness between the respective regions 4$s$ and 4$t$ may occur, resulting in failure to effectively exert the above-described action.

When the second depth db of the sub part 6B is equal to the first depth da of the main body part 6A, that is, when the first portion 6 is not divided into the main body part 6A and the sub part 6B, snow or ice within the second portion 7 is smoothly discharged from the main body part 6A and the sub part 6B.

The first portion 6 includes a groove wall 8 formed in a step shape by the main body part 6A and the sub part 6B. Such a groove wall 8 increases snow column shearing force.

The groove wall 8 includes, for example, a first groove wall 8a, a second groove wall 8b, and a third groove wall 8c. In the present embodiment, the first groove wall 8a extends in the tire radial direction so as to be connected to a groove bottom 6s of the main body part 6A, and forms a groove wall of the main body part 6A. In the present embodiment, the second groove wall 8b extends from the tread surface 4h of the land portion 4 inward in the tire radial direction, and forms a groove wall of the sub part 6B. In the present embodiment, the third groove wall 8c connects the first groove wall 8a to the second groove wall 8b, and forms a groove bottom of the sub part 6B. The groove wall 8 is not limited to such a mode.

The groove width w1 of the main body part 6A of the first portion 6 is preferably equal to the groove width w2 of the second portion 7. Accordingly, an excessive reduction in the stiffness of the land portion 4 is inhibited. In the present embodiment, the main body part 6A has a first groove edge 6c extending in the tire axial direction. A groove edge 5a at a first side f1 in the tire circumferential direction of the lateral groove 5 is formed, for example, by the first groove edge 6c and a groove edge 7a at the first side f1 in the tire circumferential direction of the second portion 7 such that one smooth line (arc) is drawn. Accordingly, snow within the second portion 7 is smoothly discharged to the main groove 3 side. In the present specification, the first side f is defined as a direction to the main body part 6A side as seen from the sub part 6B, and a second side f2 is defined as a direction to the sub part 6B side as seen from the main body part 6A. In the present specification, the groove width of each lateral groove 5 is a width parallel to the tire circumferential direction.

The sub part 6B includes a second groove edge 6d extending from the main groove 3 in the tire axial direction, and a third groove edge 6e that connects the second groove edge 6d to a groove edge 7b at the second side 12 in the tire circumferential direction of the second portion 7 and that extends in the tire circumferential direction. Accordingly, a groove edge 5b at the second side 12 in the tire circumferential direction of the lateral groove 5 is formed in a crank shape by the second groove edge 6d, the third groove edge 6e, and the groove edge 7b of the second portion 7.

In order to exert such action effectively, each lateral groove 5 is preferably formed in the following mode. The first depth da of the main body part 6A is preferably 50% to 80% of the groove depth d1 of the second portion 7. The length L2 in the tire axial direction of the first portion 6 is preferably 15% to 45% of the length L1 in the tire axial direction of the lateral groove 5. The groove width w2 of the second portion 7 is preferably 75% to 95% of the groove width W3 of the first portion 6. The length L2b in the tire axial direction of the sub part 6B is preferably 80% to 120% of the length L2a in the tire axial direction of the main body part 6A. In the present embodiment, the length L2b in the tire axial direction of the sub part 6B is equal to the length L2a in the tire axial direction of the main body part 6A.

In the present embodiment, each lateral groove 5 has a terminal end 5e within the land portion 4. Such a lateral groove 5 keeps the stiffness of the land portion 4 high. In the present embodiment, the terminal end 5e is provided to the second portion 7.

In the present embodiment, the land portion 4 has sipes 10 extending from the terminal ends 5e. Such sipes 10 each increase deformation of the lateral groove 5 and effectively push and discharge snow or ice within the groove when the lateral groove 5 comes into contact with the ground. In addition, the sipes 10 scratch an ice road surface to generate traction. The sipes 10 enhance the ice and snow road performance. In the present embodiment, the sipes 10 extend in a straight manner. The sipes 10 can take various modes such as a wavy manner and a zigzag manner.

In the present embodiment, each sipe 10 connects the main groove 3 to the lateral groove 5. Accordingly, the ice and snow road performance is kept high. The sipe 10 is not limited to such a mode, and, for example, may have a terminal end (not shown) within the land portion 4. In the present specification, a sipe is defined as a cut having a width less than 1.5 mm and is distinguished from a groove having a width equal to or greater than 1.5 mm.

The sipe 10 preferably has a depth d3 smaller than the groove depth d1 of the second portion 7 of the lateral groove 5, and the depth d3 is further preferably 20% to 40% of the groove depth d1. If the depth d3 of the sipe 10 is less than 20% of the groove depth d1 of the second portion 7, deformation of the lateral groove 5 may be reduced, and thus it may be impossible to keep the ice and snow road performance high. If the depth d3 of the sipe 10 is equal to or larger than the groove depth d1 of the second portion 7, the stiffness of the land portion 4 may be decreased, and thus the steering stability may deteriorate.

The land portion 4 has circumferential recesses 12 that are provided at a corner portion k between the tread surface 4h of the land portion 4 and a groove wall 3e of the main groove 3 and that extend in the tire circumferential direction. In the present embodiment, each circumferential recess 12 includes a wall portion 12a extending from the tread surface 4h inward in the tire radial direction, and a bottom portion 12b that extends from the inner end in the tire radial direction of the wall portion 12a along the tread surface 4h and that is connected to the groove wall 3e. Such a circumferential recess 12 exerts snow column shearing force. The circumferential recess 12 is not limited to such a mode.

In the present embodiment, the circumferential recess 12 has a width w4 in the tire axial direction of 1.0 to 3.0 mm. The circumferential recess 12 has, for example, a depth d4 in the tire radial direction of 1.0 to 3.0 mm. The length L4 in the tire circumferential direction of the circumferential recess 12 is preferably 20% to 40% of a pitch P in the tire circumferential direction between the lateral grooves 5.

The circumferential recess 12 communicates with the first side f1 in the tire circumferential direction of the first portion 6 of the lateral groove 5. That is, the circumferential recess 12 communicates with the main body part 6A having a first depth da, and thus effectively discharges snow or ice within the groove in cooperation with the main body part 6A.

The land portion 4 has chamfers 14 provided at the corner portion k between the tread surface 4h of the land portion 4 and the groove wall 3e of the main groove 3, and the chamfers 14 extend in the tire circumferential direction and are recessed less than the circumferential recesses 12. In the present embodiment, each chamfer 14 is formed as a surface inclined more gently relative to the tire radial direction than the groove wall 3e of the main groove 3. Such a chamfer 14 exerts scratching force on a road surface while maintaining the stiffness of the corner portion k, thereby enhancing the steering stability and the ice and snow road performance in a well-balanced manner. For example, the chamfer 14 may be formed as a linear flat surface as shown in FIG. 3(a), or may be formed as an arc surface that projects outward in the tire radial direction.

Such a chamfer 14 preferably has a width w5 in the tire axial direction of equal to or greater than 0.5 mm and less than 1.0 mm. In addition, the chamfer 14 preferably has, for example, a depth d5 in the tire radial direction of equal to or greater than 0.5 mm and less than 1.0 mm.

In the present embodiment, each chamfer 14 communicates with the second side f2 in the tire circumferential direction of the first portion 6 of the lateral groove 5. The chamfers 14 are provided, for example, at the corner portion k excluding the lateral grooves 5 and the circumferential recesses 12. Accordingly, the above-described action is effectively exerted. The land portion 4 of the present embodiment has corner portions k at both sides in the tire axial direction, and the circumferential recesses 12 and the chamfers 14 are provided at each corner portion k.

Figure 4:
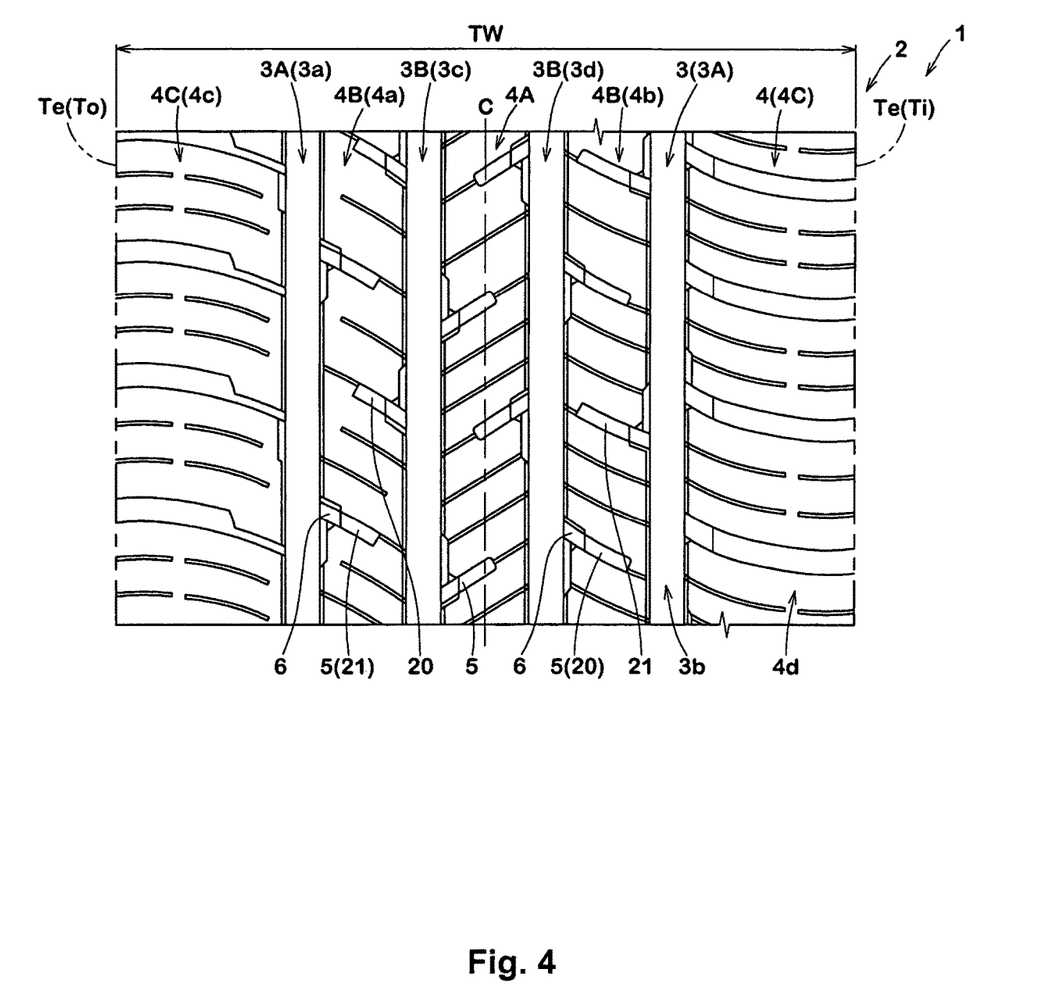
FIG. 4 is a development of the entirety of the tread portion having lateral grooves in FIG. 1.

FIG. 4 is a development of the entirety of the tread portion 2 having the lateral grooves 5 shown in FIG. 1 to FIG. 3(b). As shown in FIG. 4, the tread portion 2 of this embodiment has a plurality of main grooves 3. The main grooves 3 include a pair of shoulder main grooves 3A located at the endmost tread edge Te sides, and a pair of crown main grooves 3B adjacent to the inner sides in the tire axial direction of the respective shoulder main grooves 3A.

Accordingly, the land portion 4 has, for example, a crown land portion 4A, a pair of middle land portions 4B adjacent to the crown land portion 4A, and a pair of shoulder land portions 4C adjacent to the middle land portions 4B and provided at the endmost tread edge Te sides. In the present embodiment, the crown land portion 4A is demarcated between the pair of crown main grooves 3B. In the present embodiment, each middle land portion 4B is demarcated between the crown main groove 3B and the shoulder main groove 3A. In the present embodiment, each shoulder land portion 4C is demarcated between the shoulder main groove 3A and the tread edge Te.

The "tread edges" Te are defined as ground contact positions at both endmost sides in the tire axial direction when a normal load is applied to the tire 1, in a normal state where the tire 1 is mounted to a normal rim (not shown) and inflated to a normal internal pressure and no load is applied to the tire 1, such that the tire 1 is brought into contact with a plane at a camber angle of 0 degrees. In the normal state, the distance in the tire axial direction between both tread edges Te is defined as a tread width TW. Unless otherwise specified, dimensions of components of the tire and the like are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard. In the case where the tire is for a passenger car, the normal internal pressure is 180 kPa.

The "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard. In the case where the tire is for a passenger car, the normal load is a load corresponding to 88% of the load described above.

In the present embodiment, the land portion 4 having the above-described lateral grooves 5 is formed as the pair of middle land portions 4B. Greater contact pressure acts on the middle land portions 4B than on the shoulder land portions 4C. During turning, greater lateral force acts on the middle land portions 4B than on the crown land portion 4A. By providing the lateral grooves 5 to the middle land portions 4B on which relatively great contact pressure and lateral force act as described above, it is possible to effectively exert action to enhance the steering stability while maintaining the ice and snow road performance.

Each middle land portion 4B has, as the lateral grooves 5, first middle lateral grooves 20 each having a first portion 6 at the crown land portion 4A side, and second middle lateral grooves 21 each having a first portion 6 at the shoulder land portions 4C side. Accordingly, great snow column shearing force can be exerted, and snow or ice within the grooves can be discharged to the crown main groove 3B and the shoulder main groove 3A.

The first middle lateral grooves 20 and the second middle lateral grooves 21 are alternately provided in the tire circumferential direction. Accordingly, the stiffness in the tire circumferential direction of each middle land portion 4B can be ensured in a well-balanced manner in the tire axial direction.

In the present embodiment, the tread portion 2 specifies how the tire 1 is to be oriented when mounted to a vehicle. Accordingly, the tread edges Te of the present embodiment include an outer tread edge To located at the outer side of the vehicle when the tire 1 is mounted on the vehicle, and an inner tread edge Ti located at the inner side of the vehicle when the tire 1 is mounted on the vehicle.

In the present embodiment, the shoulder main grooves 3A include an outer shoulder main groove 3a located at the endmost outer tread edge To side, and an inner shoulder main groove 3b located at the endmost inner tread edge Ti side. In addition, the crown main grooves 3B include an outer crown main groove 3c adjacent to the endmost outer shoulder main groove 3a, and an inner crown main groove 3d adjacent to the endmost inner shoulder main groove 3b.

The respective middle land portions 4B include an outer middle land portion 4a located at the outer tread edge To side, and an inner middle land portion 4b located at the inner tread edge Ti side. The respective shoulder land portions 4C include an outer shoulder land portion 4c located at the outer tread edge To side, and an inner shoulder land portion 4d located at the inner tread edge Ti side.

Figure 5:
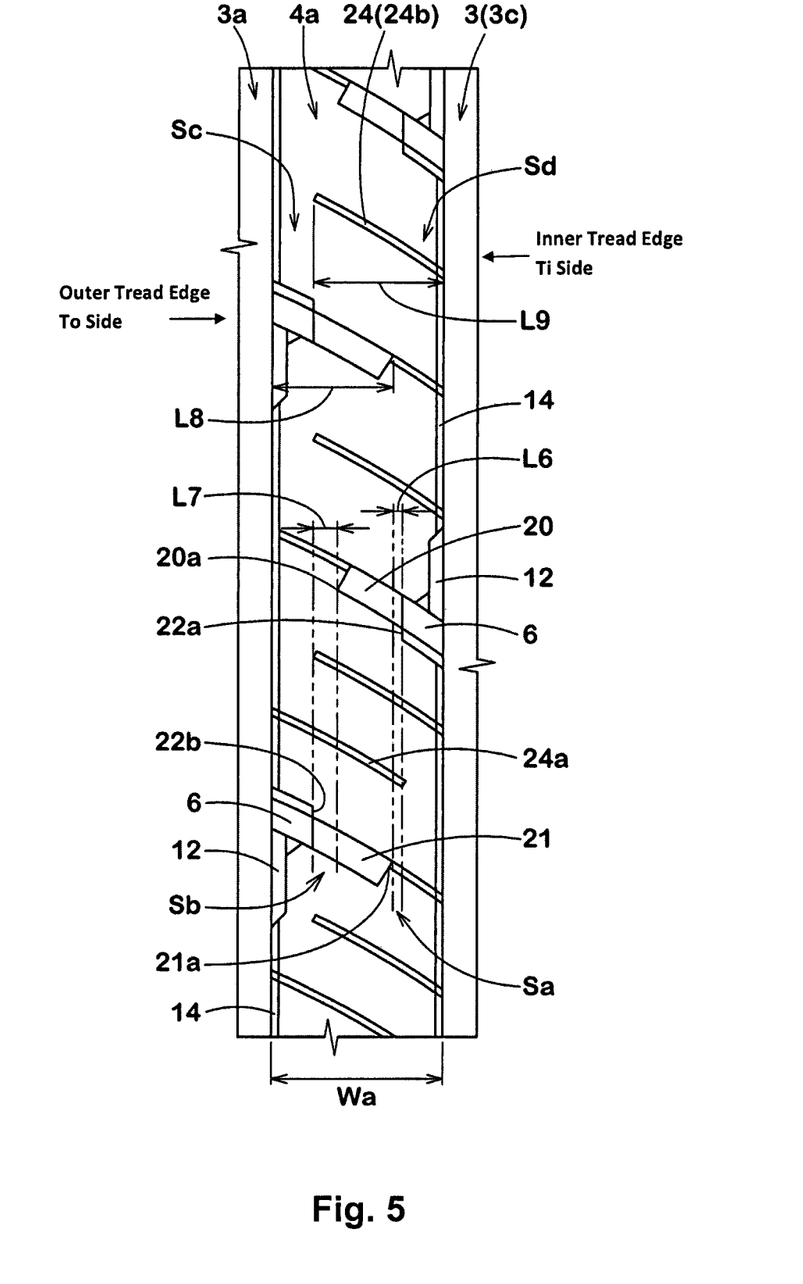
FIG. 5 is an enlarged view of an outer middle land portion in FIG. 4.

FIG. 5 is a development of the outer middle land portion 4a. The outer middle land portion 4a is generally a land portion 4 on which greater lateral force acts than on the crown land portion 4A and the inner middle land portion 4b (shown in FIG. 4) during turning, and thus keeping the stiffness of the outer middle land portion 4a high is effective for improving the steering stability. Thus, as shown in FIG. 5, in the outer middle land portion 4a, the second middle lateral grooves 21 are formed without facing the first portions 6 of the first middle lateral grooves 20 in the tire circumferential direction. The stiffness of such an outer middle land portion 4a is kept high, and thus the steering stability is enhanced. The distance L6 in the tire axial direction between an inner end 21a at the inner tread edge Ti side of the second middle lateral groove 21 and an inner end 22a at the outer tread edge To side of the first portion 6 of the first middle lateral groove 20 is preferably 4% to 10% of the width Wa in the tire axial direction of the outer middle land portion 4a.

From the same viewpoint, in the outer middle land portion 4a, the first middle lateral grooves 20 are preferably formed without facing the first portions 6 of the second middle lateral grooves 21 in the tire circumferential direction. In the outer middle land portion 4a, the distance L7 in the tire axial direction between an inner end 20a at the outer tread edge To side of the first middle lateral groove 20 and an inner end 22b at the inner tread edge Ti side of the first portion 6 of the second middle lateral groove 21 is preferably larger than the distance L6 in the tire axial direction. That is, in the present embodiment, a region Sb where the distance L7 is taken is located outward in the tire axial direction of a region Sa where the distance L6 is taken, and thus greater lateral force acts on the region Sb. Therefore, by making the distance L7 larger than the distance L6, the steering stability can be further enhanced. From such a viewpoint, the distance L7 is preferably 10% to 20% of the width Wa in the tire axial direction of the outer middle land portion 4a.

In order to further improve the steering stability while further maintaining the ice and snow road performance, the length L8 in the tire axial direction of each of the first middle lateral grooves 20 and the second middle lateral grooves 21 of the outer middle land portion 4a is preferably 50% to 75% of the width Wa in the tire axial direction of the outer middle land portion 4a.

The outer middle land portion 4a of the present embodiment has outer middle Sipes 24 extending in the tire axial direction. In the present embodiment, each outer middle sipe 24 extends from the main groove 3 and terminates within the outer middle land portion 4a. Such an outer middle sipe 24 inhibits an excessive reduction in the stiffness of the outer middle land portion 4a.

The outer middle sipes 24 include, for example, first outer middle sipes 24a connected to the outer shoulder main groove 3a, and second outer middle sipes 24b connected to the outer crown main groove 3c. Accordingly, the stiffness of the outer middle land portion 4a can be ensured in a well-balanced manner in the tire axial direction.

The number of the first outer middle sipes 24a is smaller than the number of the second outer middle sipes 24b. Accordingly, the stiffness of a region Sc at the outer side in the tire axial direction of the outer middle land portion 4a on which relatively great lateral force acts is kept higher than the stiffness of a region Sd at the inner side in the tire axial direction of the outer middle land portion 4a. Thus, the steering stability is improved.

Each outer middle sipe 24 is formed such that the length L9 in the tire axial direction of the outer middle sipe 24 is larger than the length L8 in the tire axial direction of each of the first middle lateral grooves 20 and the second middle lateral grooves 21 provided to the outer middle land portion 4a. Accordingly, the above-described action is effectively exerted. For example, the length L9 in the tire axial direction of the outer middle sipe 24 is preferably 125% to 150% of the length L8 in the tire axial direction of each of the first middle lateral grooves 20 and the second middle lateral grooves 21.

Each outer middle sipe 24 communicates only with the chamfer 14 without communicating with the circumferential recess 12. Such an outer middle sipe 24 inhibits a reduction in the stiffness of the outer middle land portion 4a.

Figure 6:
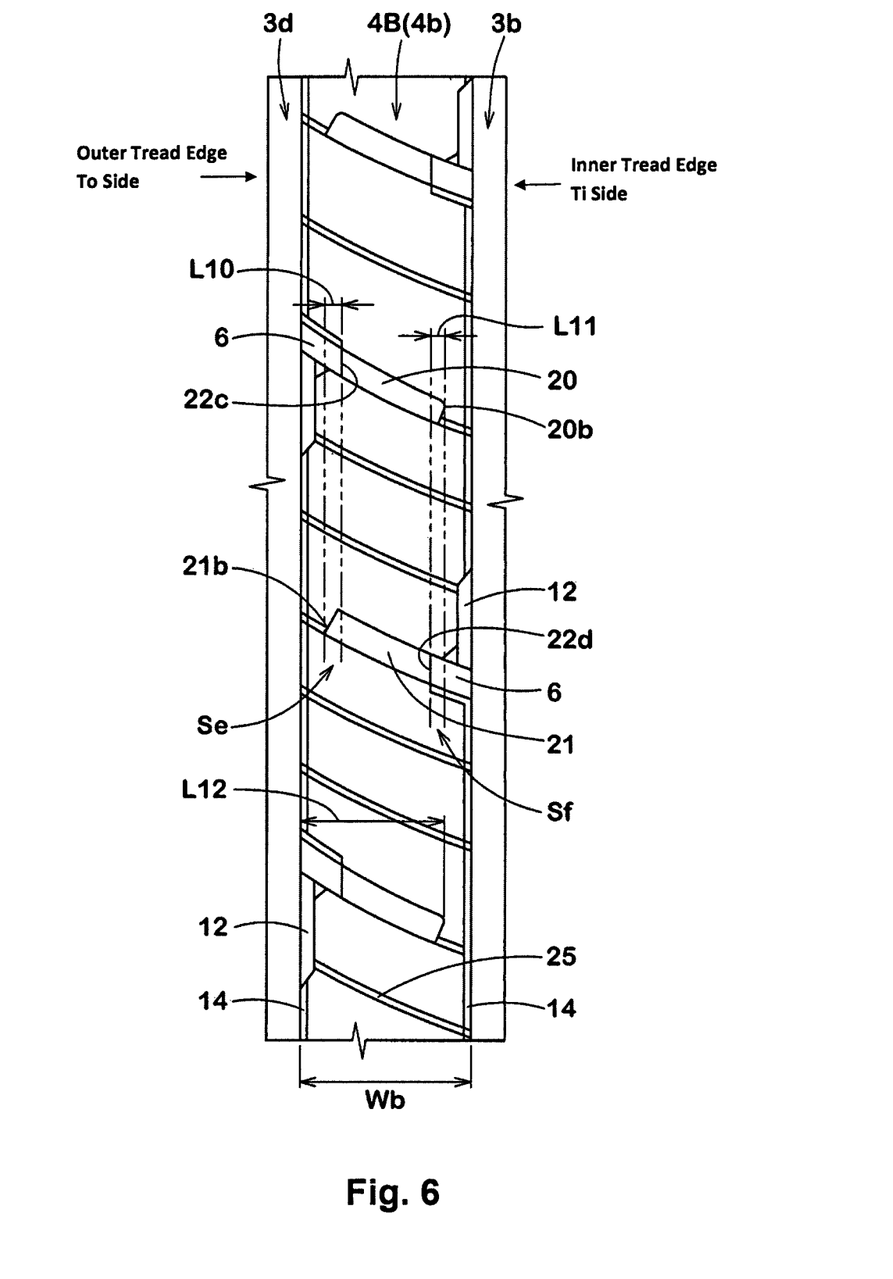
FIG. 6 is an enlarged view of an inner middle land portion in FIG. 4.

FIG. 6 is a development of the inner middle land portion 4b. As shown in FIG. 6, in the inner middle land portion 4b, the second middle lateral grooves 21 are formed so as to face the first portions 6 of the first middle lateral grooves 20 in the tire circumferential direction. Generally, relatively smaller lateral force acts on the inner middle land portion 4b than on the outer middle land portion 4a. Thus, even when the stiffness of the inner middle land portion 4b is reduced to be lower than that of the outer middle land portion 4a, the influence of such a reduction on the steering stability is small. Thus, by making the second middle lateral grooves 21 and the first portions 6 of the first middle lateral grooves 20 face each other in the tire circumferential direction, that is, overlap each other in the tire circumferential direction, greater snow column shearing force can be obtained, and maintenance of the ice and snow road performance is promoted. The distance L10 in the tire axial direction between an inner end 21b at the outer tread edge To side of the second middle lateral groove 21 and an inner end 22c at the inner tread edge Ti side of the first portion 6 of the first middle lateral groove 20 is preferably 10% to 20% of the width Wb in the tire axial direction of the inner middle land portion 4b.

From the same viewpoint, in the inner middle land portion 4b, the first middle lateral grooves 20 are preferably formed so as to face the first portions 6 of the second middle lateral grooves 21 in the tire circumferential direction. In the inner middle land portion 4b, the distance L11 in the tire axial direction between an inner end 20b at the inner tread edge Ti side of the first middle lateral groove 20 and an inner end 22d at the outer tread edge To side of the first portion 6 of the second middle lateral groove 21 is preferably smaller than the distance L10 in the tire axial direction. That is, in the present embodiment, a region Sf where the distance L11 is taken is located outward in the tire axial direction of a region Se where the distance L10 is taken, and thus greater lateral force acts on the region Sf. Thus, by making the distance L11 smaller than the distance L10, the stiffness of the region at the outer side in the tire axial direction of the inner middle land portion 4b can be maintained, and the steering stability can be further enhanced. From such a viewpoint, the distance L11 is preferably 4% to 10% of the width Wb in the tire axial direction of the inner middle land portion 4b.

In order to further improve the steering stability while further maintaining the ice and snow road performance, the length L12 in the tire axial direction of each of the first middle lateral grooves 20 and the second middle lateral grooves 21 of the inner middle land portion 4b is preferably 70% to 95% of the width Wb in the tire axial direction of the inner middle land portion 4b.

The inner middle land portion 4b of the present embodiment has inner middle sipes 25 extending in the tire axial direction. In the present embodiment, each inner middle sipe 25 crosses the inner middle land portion 4b. Such an inner middle sipe 25 exerts great friction force on an ice road surface.

In the present embodiment, each inner middle sipe 25 communicates with the circumferential recess 12. Accordingly, when the circumferential recess 12 comes into contact with the ground, deformation of the circumferential recess 12 is promoted, and snow or ice within the circumferential recess 12 is smoothly discharged.

Figure 7:
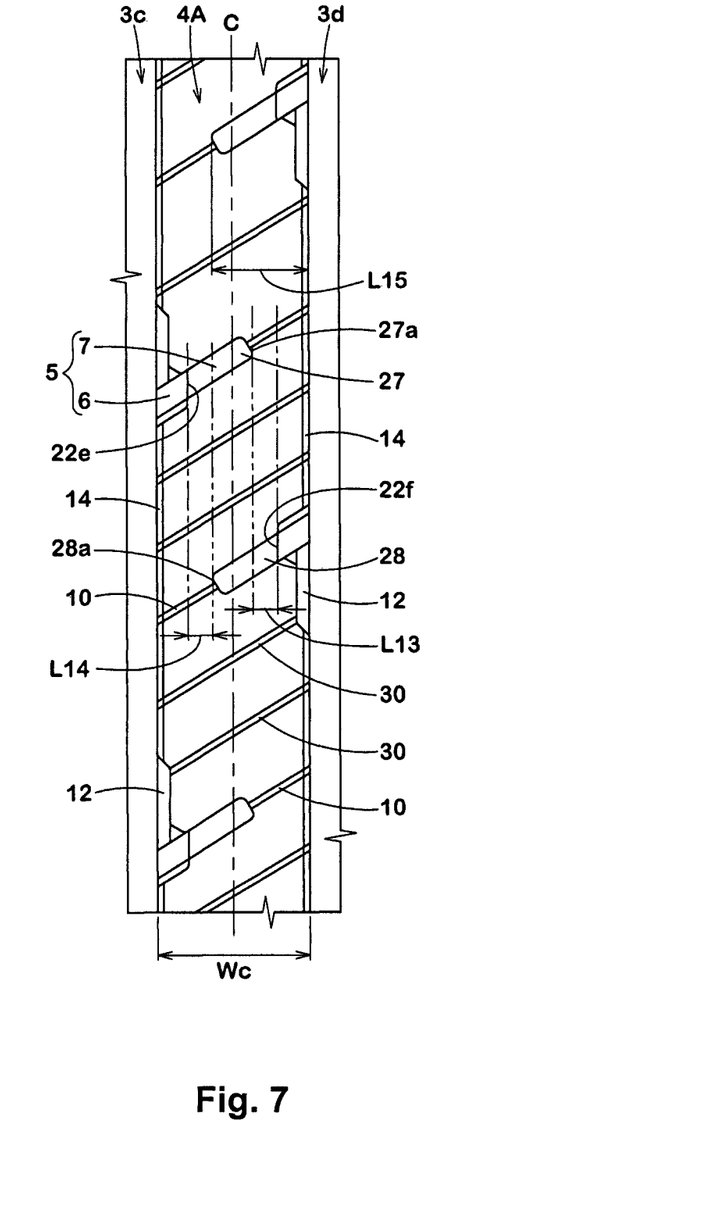
FIG. 7 is an enlarged view of a crown land portion in FIG. 4.

FIG. 7 is a development of the crown land portion 4A. As shown in FIG. 7, the land portion 4 having the lateral grooves 5 each having the first portion 6 and the second portion 7 may be formed as the crown land portion 4A. The crown land portion 4A is a land portion 4 on which great contact pressure acts. Thus, the lateral grooves 5 provided to the crown land portion 4A exert great snow column shearing force.

The lateral grooves 5 include first crown lateral grooves 27 each having a first portion 6 that communicates with the outer crown main groove 3c, and second crown lateral grooves 28 each having a first portion 6 that communicates with the inner crown main groove 3d. In the present embodiment, the first crown lateral grooves 27 and the second crown lateral grooves 28 are alternately provided in the tire circumferential direction. Accordingly, the stiffness in the tire circumferential direction of the crown land portion 4A can be ensured in a well-balanced manner in the tire axial direction.

In the crown land portion 4A, the second crown lateral grooves 28 are formed without facing the first portions 6 of the first crown lateral grooves 27 in the tire circumferential direction. Similarly, the first crown lateral grooves 27 are formed without facing the first portions 6 of the second crown lateral grooves 28 in the tire circumferential direction. The stiffness of such a crown land portion 4A is kept high, and thus the steering stability is enhanced. The distance L13 in the tire axial direction between an inner end 28a at the outer tread edge To side of the second crown lateral groove 28 and an inner end 22e at the inner tread edge Ti side of the first portion 6 of the first crown lateral groove 27 is preferably 10% to 20% of the width Wc in the tire axial direction of the crown land portion 4A. The distance L14 in the tire axial direction between an inner end 27a at the inner tread edge Ti side of the first crown lateral groove 27 and an inner end 22f at the outer tread edge To side of the first portion 6 of the second crown lateral groove 28 is preferably 10% to 20% of the width Wc in the tire axial direction of the crown land portion 4A.

The length L15 in the tire axial direction of each lateral groove 5 provided to the crown land portion 4A is not particularly limited, but is preferably 50% to 75% of the width Wc in the tire axial direction of the crown land portion 4A.

The crown land portion 4A of the present embodiment has crown sipes 30 extending in the tire axial direction. In the present embodiment, each crown sipe 30 crosses the crown land portion 4A. Such a crown sipe 30 exerts great friction force on an ice road surface.

In the present embodiment, each crown sipe 30 communicates with the circumferential recess 12. Accordingly, when the circumferential recess 12 comes into contact with the ground, deformation of the circumferential recess 12 is promoted, and snow or ice within the circumferential recess 12 is smoothly discharged.

Figure 8:
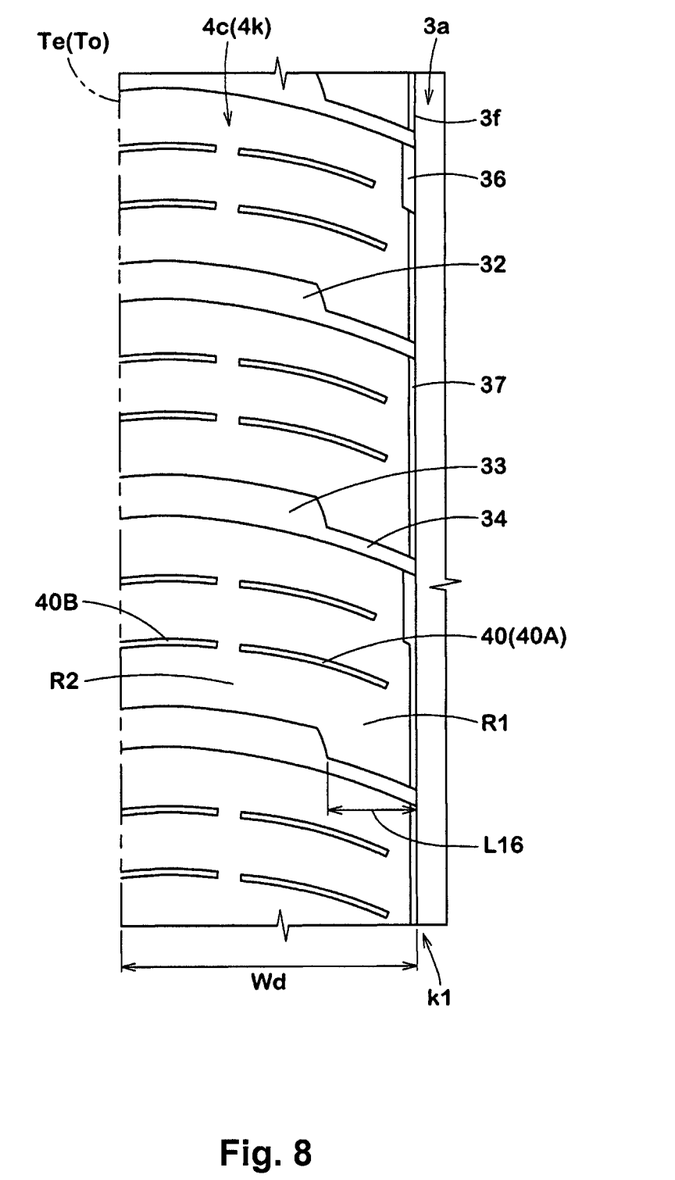
FIG. 8 is an enlarged view of an outer shoulder land portion in FIG. 4.

FIG. 8 is a development of the outer shoulder land portion 4c. As shown in FIG. 8, the outer shoulder land portion 4c of the present embodiment has outer shoulder lateral grooves 32 extending from the outer shoulder main groove 3a toward the outer tread edge To side.

In the present embodiment, each outer shoulder lateral groove 32 includes a first outer portion 33 extending in the tire axial direction at the outer tread edge To side, and a second outer portion 34 that connects the first outer portion 33 to the outer shoulder main groove 3a and that has a smaller groove width than the first outer portion 33. Such an outer shoulder lateral groove 32 reduces the difference in stiffness between a region R1, near the second outer portion 34, having relatively low stiffness and a region R2, near the first outer portion 33, having relatively high stiffness. Accordingly, the outer shoulder land portion 4c provides uniform friction force over a wide range to a road surface, and thus improves the steering stability.

The length L16 in the tire axial direction of the second outer portion 34 is preferably 20% to 40% of the width Wd in the tire axial direction of the outer shoulder land portion 4c.

In the present embodiment, the outer shoulder land portion 4c has circumferential recesses 36, and chamfers 37 that are recessed less than the circumferential recesses 36. In the present embodiment, the circumferential recesses 36 and the chamfers 37 are provided at a corner portion k1 between a tread surface 4k of the outer shoulder land portion 4c and a groove wall 3f of the outer shoulder main groove 3a. Each circumferential recess 36 is, for example, connected to the second outer portion 34. Each chamfer 37 is, for example, connected to the second outer portion 34 or the circumferential recess 36.

The circumferential recesses 36 are formed in the same manner as the circumferential recesses 12 described with reference to FIG. 1 to FIG. 3(b), and thus the detailed description thereof is omitted. The chamfers 37 are also formed in the same manner as the chamfers 14 described with reference to FIG. 1 to FIG. 3(b), and thus the detailed description thereof is omitted.

In the present embodiment, the outer shoulder land portion 4c has outer shoulder sipes 40 extending in the tire axial direction. In the present embodiment, the outer shoulder sipes 40 include first outer shoulder sipes 40A and second outer shoulder sipes 40B. Each first outer shoulder sipe 40A of the present embodiment terminates at both ends thereof within the outer shoulder land portion 4c. Each second outer shoulder sipe 40B has an inner end located outward of the first outer shoulder sipe 40A in the tire axial direction, and extends to the outer tread edge To. Such outer shoulder sipes 40 maintain the ice and snow road performance while inhibiting an excessive reduction in the stiffness of the outer shoulder land portion 4c.

Figure 9:
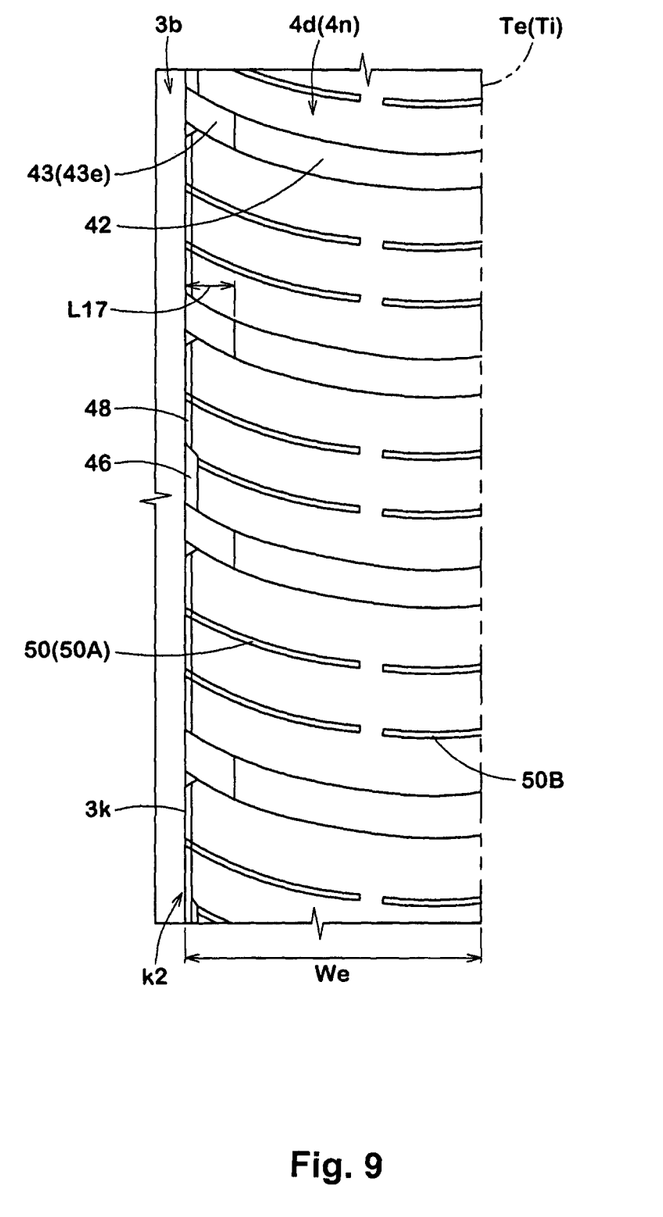
FIG. 9 is an enlarged view of an inner shoulder land portion in FIG. 4.

FIG. 9 is a development of the inner shoulder land portion 4d. As shown in FIG. 9, the inner shoulder land portion 4d of the present embodiment has inner shoulder lateral grooves 42 extending from the inner shoulder main groove 3b toward the inner tread edge Ti side.

In the present embodiment, each inner shoulder lateral groove 42 has a tie bar 43 raised at a groove bottom thereof. Such a tie bar 43 inhibits a reduction in the stiffness of the inner shoulder land portion 4d and enhances the steering stability. The tie bar 43 is connected to the inner shoulder main groove 3b. Accordingly, the difference in stiffness between the inner and outer portions in the tire axial direction of the inner shoulder land portion 4d is reduced, and thus the steering stability can be further enhanced.

The length L17 in the tire axial direction of such a tie bar 43 is, for example, preferably 10% to 25% of the width We in the tire axial direction of the inner middle land portion 4b. A tie bar depth (not shown) from a tread surface 4n of the inner shoulder land portion 4d to an outer surface 43e of the tie bar 43 is preferably 25% to 45% of the groove depth (not shown) of the inner shoulder main groove 3b.

In the present embodiment, the inner shoulder land portion 4d has circumferential recesses 46, and chamfers 48 that are recessed less than the circumferential recesses 46. In the present embodiment, the circumferential recesses 46 and the chamfers 48 are provided at a corner portion k2 between the tread surface 4n of the inner shoulder land portion 4d and a groove wall 3k of the inner shoulder main groove 3b. Each circumferential recess 46 is, for example, connected to the inner shoulder lateral groove 42. Each chamfer 48 is, for example, connected to the inner shoulder lateral groove 42 or the circumferential recess 46.

The circumferential recesses 46 are formed in the same manner as the circumferential recesses 12 described with reference to FIG. 1 to FIG. 3(b), and thus the detailed description thereof is omitted. The chamfers 48 are also formed in the same manner as the chamfers 14 described with reference to FIG. 1 to FIG. 3(b), and thus the detailed description thereof is omitted.

In the present embodiment, the inner shoulder land portion 4d has inner shoulder sipes 50 extending in the tire axial direction. In the present embodiment, the inner shoulder sipes 50 include first inner shoulder sipes 50A and second inner shoulder sipes 50B. Each first inner shoulder sipe 50A of the present embodiment extends from the inner shoulder main groove 3b outward in the tire axial direction and terminates within the inner shoulder land portion 4d. Each second inner shoulder sipe 50B has an inner end located outward of the first inner shoulder sipe 50A in the tire axial direction, and extends to the inner tread edge Ti.

Although the tire according to the embodiment of the present invention has been described in detail above, the present invention is not limited to the above specific embodiments, and various modifications can be made to implement the present invention.

EXAMPLES

Tires with a size of 215/60R 16 having the basic pattern in FIG. 4 were produced as sample tires on the basis of specifications in Table 1, and were tested for ice and snow road performance and steering stability. The common specifications and the test method for all the sample tires are as follows.

d1: 6.4 mm
w3: 3.8 mm

Ice and Snow Road Performance/Steering Stability

The sample tires were mounted to all the wheels of a front-wheel-drive vehicle having an engine displacement of 1500 cc, under the following conditions, and a test driver drove the vehicle on a test course with an ice and snow road surface and on a test course with a dry asphalt road surface. Sensory evaluation was made by the test driver for running characteristics regarding handling responsiveness, traction, grip performance, and the like at that time. The results are indicated as scores with the result of Comparative Example 1 being regarded as 100. A higher numerical value indicates that the result is better.

Rim (all wheels): 16×6.5 J

Internal pressure (all wheels): 240 kPa

TABLE 1

|  | Comparative Example 1 | Comparative Example 2 | Example 1 | Example 2 | Example 3 | Example 4 | Example 5 | Example 6 |
| --- | --- | --- | --- | --- | --- | --- | --- | --- |
| Groove width ratio w2/w3 (%) | 100 | 85 | 85 | 85 | 85 | 85 | 85 | 70 |
| Groove depth ratio da/d1 (%) | 100 | 100 | 65 | 65 | 65 | 65 | 65 | 65 |
| Groove depth ratio db/da (%) | 100 | 100 | 100 | 75 | 75 | 75 | 75 | 75 |
| Length ratio L2b/L2a (%) | — | — | — | 100 | 125 | 100 | 100 | 100 |
| Distance in tire axial direction L6/Wa (%) | — | — | 8 | 8 | 8 | 15 | 8 | 8 |
| Distance in tire axial direction L7/Wa (%) | — | — | 15 | 15 | 15 | 8 | 15 | 15 |
| Distance in tire axial direction L10/Wb (%) | — | — | 15 | 15 | 15 | 8 | 8 | 15 |
| Distance in tire axial direction L11/Wb (%) | — | — | 8 | 8 | 8 | 15 | 15 | 8 |
| Ice and snow road performance [Score: higher value is better] | 100 | 90 | 108 | 105 | 102 | 105 | 105 | 102 |
| Steering stability [Score: higher value is better] | 100 | 110 | 115 | 120 | 122 | 112 | 116 | 122 |

As a result of the test, it was confirmed that the tires of the examples exhibit good steering stability, while maintaining ice and snow road performance, as compared to the tires of the comparative examples.

What is claimed is:

1. A tire comprising:
a tread portion, wherein
the tread portion has a plurality of main grooves continuously extending in a tire circumferential direction, a land portion adjacent to one or more main groove among the plurality of main grooves, and a pair of shoulder land portions that sandwich the land portion and the plurality of main grooves,
the land portion has lateral grooves extending from the main groove in a tire axial direction,
each of the lateral grooves has a first portion communicating with the main groove, and a second portion connected to the first portion,
the first portion has a larger groove width than the second portion and has a smaller groove depth than the second portion,
the first portion includes a main body part having a first depth and a sub part having a second depth smaller than the first depth,
the main body part having a first width and the sub part having a second width smaller than the first width,
the first depth of the main body part is larger than the first width of the main body part,
the second depth of the sub part is larger than the second width of the sub part, and the main body part and the sub part are aligned in the tire circumferential direction.

2. The tire according to claim 1, wherein the first portion includes a groove wall formed in a step shape by the main body part and the sub part.

3. The tire according to claim 1, wherein the first width of the main body part is equal to a groove width of the second portion.

4. The tire according to claim 1, wherein:
the tread portion has a crown land portion and a pair of middle land portions adjacent to the crown land portion,
the pair of shoulder land portions are adjacent to the middle land portions and provided at endmost tread edge sides,
the land portion is formed as at least one of the pair of middle land portions,
each of the middle land portions has, as the lateral grooves, first middle lateral grooves each having the first portion at the crown land portion side, and second middle lateral grooves each having the first portion at the shoulder land portion side,
the first middle lateral grooves and the second middle lateral grooves are alternately provided in the tire circumferential direction,
the tread portion specifies how the tire is to be oriented when mounted to a vehicle,
the middle land portions include an outer middle land portion located at an outer side of the vehicle when the tire is mounted on the vehicle,
in the outer middle land portion, the second middle lateral grooves are formed without facing the first portions of the first middle lateral grooves in the tire circumferential direction, and
the land portion is formed as the crown land portion.

5. The tire according to claim 1, wherein the land portion includes chamfers that extend in the tire circumferential direction and form at least one circumferential edge of the land portion that directly abuts the main groove.

6. The tire according to claim 1, wherein the land portion further includes a chamfer extending in the tire circumferential direction along the main groove and that is directly connected with the sub part.

7. The tire according to claim 1, wherein the land portion further includes a circumferential recess extending in the tire circumferential direction along the main groove and that is directly connected with the main body part.

8. The tire according to claim 1, wherein the land portion further includes:
a chamfer extending in the tire circumferential direction along the main groove and that is directly connected with the sub part, and
a circumferential recess extending in the tire circumferential direction along the main groove and that is directly connected with the main body part, wherein
the chamfer includes a third depth and the circumferential recess includes a fourth depth larger than the third depth,
the third depth of the chamfer and the fourth depth of the circumferential recess are each smaller than the first depth of the main body part, and
the third depth of the chamfer and the fourth depth of the circumferential recess are each smaller than the second depth of the sub part.

9. The tire according to claim 1, wherein each of the lateral grooves has a terminal end within the land portion.

10. The tire according to claim 9, wherein the land portion has sipes extending from the terminal end.

11. The tire according to claim 1, wherein:
the land portion has circumferential recesses that are provided at a corner portion between a tread surface of the land portion and a groove wall of the main groove and that extend in the tire circumferential direction, and
each of the circumferential recesses communicates with a first side in the tire circumferential direction of the first portion of the lateral groove.

12. The tire according to claim 11, wherein:
each of the circumferential recesses communicates with the main body part of the first portion of the lateral groove,
the land portion has chamfers that are provided at the corner portion between the tread surface of the land portion and the groove wall of the main groove, that extend in the tire circumferential direction, and that are recessed less than the circumferential recesses, and
each of the chamfers communicates with a second side in the tire circumferential direction of the first portion of the lateral groove.

13. A tire comprising:
a tread portion, wherein
the tread portion has a plurality of main grooves continuously extending in a tire circumferential direction, a land portion adjacent to one or more main groove among the plurality of main grooves, and a pair of shoulder land portions that sandwich the land portion and the plurality of main grooves,
the land portion has lateral grooves extending from the main groove in a tire axial direction,
each of the lateral grooves has a first portion communicating with the main groove, and a second portion connected to the first portion,
the first portion has a larger groove width than the second portion and has a smaller groove depth than the second portion,
the first portion includes a main body part having a first depth and a sub part having a second depth smaller than the first depth,
the main body part having a first width and the sub part having a second width smaller than the first width,
the first depth of the main body part is larger than the first width of the main body part,
the second depth of the sub part is larger than the second width of the sub part,
the main body part and the sub part are aligned in the tire circumferential direction,
the first portion includes a groove wall formed in a step shape by the main body part and the sub part, and
the second depth of the sub part is 60% to 85% of the first depth of the main body part.

14. The tire according to claim 13, wherein the land portion further includes a chamfer extending in the tire circumferential direction along the main groove and that is directly connected with the sub part.

15. The tire according to claim 13, wherein the land portion further includes a circumferential recess extending in the tire circumferential direction along the main groove and that is directly connected with the main body part.

16. The tire according to claim 13, wherein the land portion further includes:
a chamfer extending in the tire circumferential direction along the main groove and that is directly connected with the sub part, and a circumferential recess extending in the tire circumferential direction along the main groove and that is directly connected with the main body part, wherein the chamfer includes a third depth and the circumferential recess includes a fourth depth larger than the third depth, the third depth of the chamfer and the fourth depth of the circumferential recess are each smaller than the first depth of the main body part, and the third depth of the chamfer and the fourth depth of the circumferential recess are each smaller than the second depth of the sub part.

17. A tire comprising:

a tread portion, wherein the tread portion has a plurality of main grooves continuously extending in a tire circumferential direction, a land portion adjacent to one or more main groove among the plurality of main grooves, and a pair of shoulder land portions that sandwich the land portion and the plurality of main grooves, the land portion has lateral grooves extending from the main groove in a tire axial direction, each of the lateral grooves has a first portion communicating with the main groove, and a second portion connected to the first portion, the first portion has a larger groove width than the second portion and has a smaller groove depth than the second portion, the first portion includes a main body part having a first depth and a sub part having a second depth smaller than the first depth, the main body part having a first width and the sub part having a second width smaller than the first width, the first depth of the main body part is larger than the first width of the main body part, the second depth of the sub part is larger than the second width of the sub part, the main body part and the sub part are aligned in the tire circumferential direction, the first portion includes a groove wall formed in a step shape by the main body part and the sub part, the second depth of the sub part is 60% to 85% of the first depth of the main body part, the first depth of the main body part is 50% to 80% of a groove depth of the second portion, a length in the tire axial direction of the sub part is 80% to 120% of a length in the tire axial direction of the main body part, and a length in the tire axial direction of the first portion is 15% to 45% of a length in the tire axial direction of one of the lateral grooves.

18. The tire according to claim 17, wherein the land portion further includes a chamfer extending in the tire circumferential direction along the main groove and that is directly connected with the sub part.

19. The tire according to claim 17, wherein the land portion further includes a circumferential recess extending in the tire circumferential direction along the main groove and that is directly connected with the main body part.

20. The tire according to claim 17, wherein the land portion further includes:

a chamfer extending in the tire circumferential direction along the main groove and that is directly connected with the sub part, and a circumferential recess extending in the tire circumferential direction along the main groove and that is directly connected with the main body part, wherein the chamfer includes a third depth and the circumferential recess includes a fourth depth larger than the third depth, the third depth of the chamfer and the fourth depth of the circumferential recess are each smaller than the first depth of the main body part, and the third depth of the chamfer and the fourth depth of the circumferential recess are each smaller than the second depth of the sub part.

* * * * *